(12) United States Patent
Akimoto (10) Patent No.: US 7,434,255 B2
(45) Date of Patent: Oct. 7, 2008

(54) ENCRYPTION ERROR MONITORING SYSTEM AND METHOD FOR PACKET TRANSMISSION

(75) Inventor: Masao Akimoto, Ichikawa (JP)

(73) Assignee: Matsushita Electric Works, Ltd., Osaka (JP)

( * ) Notice: Subject to any disclaimer, the term of this patent is extended or adjusted under 35 U.S.C. 154(b) by 765 days.

(21) Appl. No.: 10/957,699

(22) Filed: Oct. 5, 2004

(65) Prior Publication Data
US 2005/0102525 A1 May 12, 2005

(30) Foreign Application Priority Data
Oct. 6, 2003 (JP) ............... 2003-347018

(51) Int. Cl.
*H04L 29/00* (2006.01)
(52) U.S. Cl. ...................................... 726/13
(58) Field of Classification Search ............... 726/13
See application file for complete search history.

(56) References Cited

U.S. PATENT DOCUMENTS

| | | | |
|---|---|---|---|
| 5,841,873 A * | 11/1998 | Lockhart et al. | 713/181 |
| 7,263,609 B1 * | 8/2007 | Wante et al. | 713/160 |
| 2001/0052072 A1 * | 12/2001 | Jung | 713/160 |
| 2003/0061507 A1 | 3/2003 | Xiong et al. | |
| 2003/0200456 A1 * | 10/2003 | Cyr et al. | 713/200 |
| 2006/0056637 A1 * | 3/2006 | Rezaiifar et al. | 380/274 |

FOREIGN PATENT DOCUMENTS

JP    10-327193 A1    12/1998

OTHER PUBLICATIONS

Communication from European Patent Office for European Patent Application No. 04023605.1-2413 dated Aug. 3, 2007.

* cited by examiner

*Primary Examiner*—Matthew B Smithers
(74) *Attorney, Agent, or Firm*—Cheng Law Group PLLC (57) ABSTRACT

An encryption error monitoring system for checking packets transmitted between a private network and an external network. The system includes includes a detector module (60) which is connected to receive the packet for determining whether or not the packet is successfully encrypted in accordance with a specific security protocol such as IPSec (Internet Protocol Security). The detector module reads from the packet a sender's address and a destination address, and provides an error signal when the packet is judged not to be successfully encrypted. A manager module (80) is connected to the detector module within the private network to create, upon receipt of the error signal, a report including the sender's address and the destination address with regard to the packet judged not to be successfully encrypted. The detector module is configured to have a judge means (66) which reads a header of the packet and checks whether or not the header includes a protocol code that matches with a particular code identifying the specific security protocol. When the header does not include the protocol code in match with the particular code, the judge means provides the error signal to notify the encryption error. Thus, the encryption error can be determined only by referring to the unencrypted header and therefore without necessitating the decryption of the packet.

9 Claims, 6 Drawing Sheets

ENCRYPTION ERROR MONITORING SYSTEM AND METHOD FOR PACKET TRANSMISSION

FIELD OF THE INVENTION

The present invention is directed to an encryption error monitoring system and also a method for checking packets transmitted between a virtual private network and an external network.

BACKGROUND OF THE INVENTION (1) List of the Prior Art

Japanese Patent Publication No. 10-327193 published on Dec. 8, 1998

(2) Brief Explanation of the Prior Art

In order to secure packets transmitted from inside or outside of a private network through an external network, i.e., the Internet, it has been proposed a virtual private network (VPN) system which provides a secure connection tunnel between the private network and a remote client machine on the Internet. The VPN system includes a VPN controller or VPN server within the private network and a VPN client software running on the client machine for encrypting original packets before transmitting it to the Internet and decrypting the packets after they reach the private network and the client machine. The encryption is accomplished by a security protocol such as Internet Protocol Security (IPSec). The VPN system is given a function of monitoring the encrypted packets transmitted through the Internet for providing a report data including statistical information about the number of VPN tunnels and throughput as well as negotiation information between the server and the client machine. In this connection, Japanese Patent Publication No. 10-327193 discloses a VPN system provided with a gateway that analyzes a header of the packet to determine whether the packets are to be encrypted, decrypted, or required no encryption, and selects a suitable algorithm for encryption and decryption of the packet.

Although the prior VPN system monitors the information about encrypted packets, it fails to check whether or not the packets is truly or successfully encrypted, and therefore may pose a danger of transmitting original unencrypted packets to the Internet.

SUMMARY OF THE INVENTION

In view of the above problem, the present invention has been accomplished to provide an encryption error monitoring system capable of checking whether or not the packets are successfully encrypted and creating a resulting report which is best utilized by a system administrator to keep the secrecy of a virtual private network from the public. The encryption error monitoring system in accordance with the present invention is adapted to be incorporated in a private network such as a local area network connected to an external network, i.e., the internet for data transmission between a client machine on the internet and the private network. The system includes a detector module which is connected to receive the packet for determining whether or not the packet is successfully encrypted in accordance with a specific security protocol such as IPSec (Internet Protocol Security). The detector module reads from the packet a sender's address and a destination address, and provides an error signal when the packet is judged not to be successfully encrypted. A manager module is connected to the detector module within the private network to create, upon receipt of the error signal, a report including the sender's address and the destination address with regard to the packet judged not to be successfully encrypted. The detector module is configured to have a judge means which reads a header of the packet and checks whether or not the header includes a protocol code that matches with a particular code identifying the specific security protocol. When the header does not include the protocol code in match with the particular code, the judge means provides the error signal to notify the encryption error. Thus, the encryption error can be determined only by referring to the unencrypted header and therefore without necessitating the decryption of the packet.

Preferably, the manager module is configured to set a condition for determining whether or not the packet is to be encrypted, and transmit the condition to the detector module. A packet filter is included in the detector module in order to filter out the packet designated to be encrypted in accordance with the condition, such that the judge means processes only the packet designated to be encrypted.

The packet when encrypted includes a security payload following the header to give an encrypted data. The judge means may be configured to read a payload length of the security payload, which is also obtained without making the decryption of the packet, and to provide the error signal when the payload length is not a multiple of a block length prescribed by the specific security protocol, even if the header includes the protocol code in mach with the particular code.

In view of that the security payload includes an encrypted trailer having a next header field which specifies an upper layer protocol, i.e., upper layer of the protocol stack designated by the specific security protocol to identify the nature of the security payload, the judge means may be also configured to give a criterion for checking a possibility of the encryption error even when the header indicates that the encryption is successful. For this purpose, the judge means reads a portion of the security payload corresponding to the next header field to take an undecrypted readout for comparison with one of default protocols already known to the judge means as identifying the upper layer protocol, and increments an uncertainty count when the following conditions are met for each of the packets transmitted within a common session so as to provide the error signal when the uncertainty count exceeds a predetermined count (m).

a) The header includes the code that matches with the particular code identifying the security protocol, and
    b) the undecrypted readout (R1) is in match with one of the default protocols.

Further, since the encrypted trailer includes, in addition to the next header fields, a padding field which adjusts a payload length of said security payload for encryption and a padding length field which identifies the payload length adjusted by the padding field, the judge means may be configured to give a more consistent criterion for checking the possibility of the encryption error even when the header indicates no encryption error. To this end, the judge means reads, the payload length, a portion of the security payload corresponding to the next header field to take a first undecrypted readout (R1) for comparison with one or more of the default protocols, and another portion of the security payload corresponding to the padding length field to take a second undecrypted readout (R2) for comparison with the payload length. The judge means increments the uncertainty count when all of the following conditions are met for each of the packets transmitted within a common session, and provides the error signal when the uncertainty count exceeds a predetermined count (m).

a) The header includes the code that matches with the particular code identifying the security protocol, b) the first undecrypted readout (R1) is in match with one of the default protocols, and c) the second undecrypted readout (R2) represents a numerical value which shorter than the payload length minus the length of the encrypted trailer except the padding field.

Since the above criteria do not require the decryption of the packet, the verification of the encryption error can be also made in a rather simple scheme, independently of the decryption processing made at another location of the virtual private network.

Further, the above criteria may include an additional condition that the payload length is a multiple of the block length which is prescribed by the specific security protocol to define the security payload for more reliable encryption error checking.

The present invention also provides a method for checking encrypted packets transmitted between the private network and the external network. Based upon a regulation that the security protocol use a particular protocol code which is stored in a unencrypted header added to the encrypted datagram and is different from an original protocol code designated in an original packet, the method includes the steps of firstly acquiring the security protocol code which identifies the specific security protocol relied upon for encrypting the original packet into the encrypted packet, and reading the unencrypted header to take therefrom the particular protocol code. Then, the protocol code is compared with the security protocol code so as to determine the encryption error when both codes are found identical to each other, i.e., the original protocol code is not altered. Upon this occurrence, the method goes to a step of creating a report listing said sender's address and said destination address for notification of the encryption error.

The method may be modified to take one of the above criteria for more consistent encryption error determination.

These and still other advantageous features of the present invention will become more apparent from the following description of the embodiments when taken in conjunction with the attached drawings.

DETAILED DESCRIPTION OF THE EMBODIMENT

Figure 1:
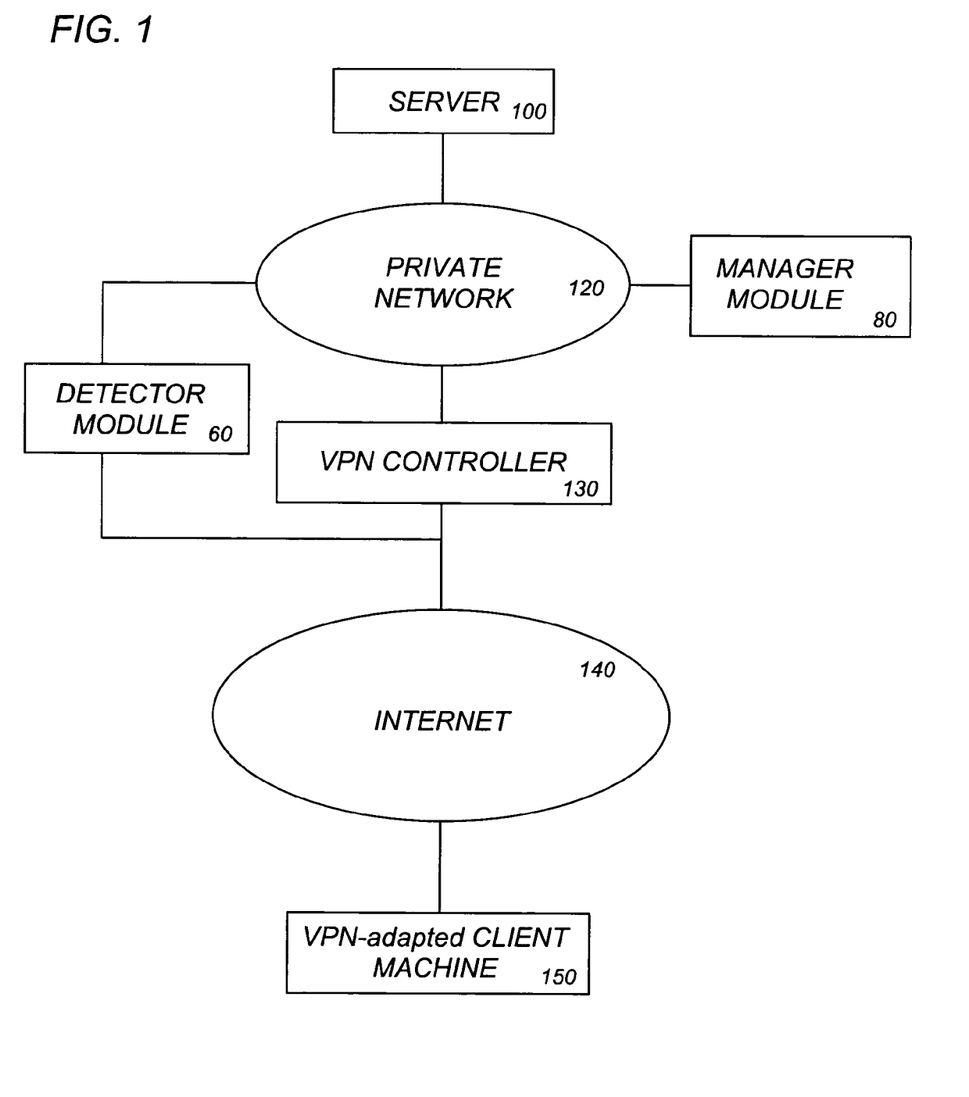
FIG. 1 is a block diagram schematically illustrating an encryption error monitoring system in accordance with a preferred embodiment of present invention shown as being incorporated in a typical virtual private network (VPN)

Referring now to FIG. 1, there is shown an encryption error monitoring system in accordance with a preferred embodiment which is incorporated in a virtual private network (VPN). VPN includes a server 100 which is connected through a private network 120 such as a local area network and through a public network, i.e., the internet 140 to a VPN-adapted client machine 150. The server 100 may includes an application server and a web-service server which receives a request from the client machine 150 and transmits requested information thereto. The server 100 is connected within the private network 120 to a VPN controller 130 that encrypts and decrypts a series of packets which are identified to require secrecy when traveling over the internet 140, thereby establishing the virtual private network expanding over the internet 140. In other words, the VPN controller 130 gives a virtual security tunnel through the internet for protecting the data. The encryption and decryption is made at each of the VPN controller 130 and the client machine 150 in accordance with a specific security protocol, for example, Encapsulated Security Paylaod (ESP) which is coded as IP protocol "ESP(50)" of the Internet Protocol Security (IPSec) policy. ESP supports two modes of operation, tunnel mode and transport mode.

Figures 2A, 2B, 2C:
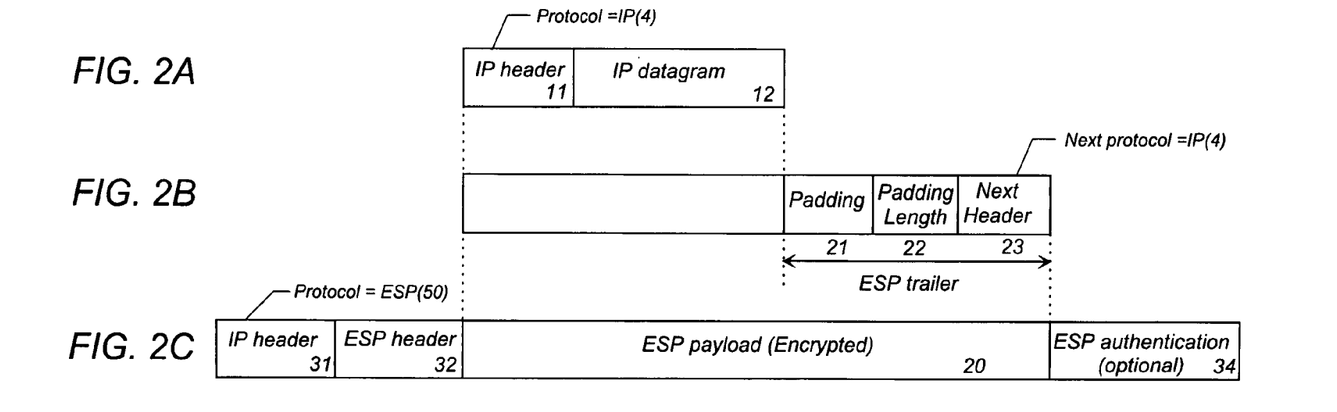
FIGS. 2A to 2C are packet structures illustrating the steps of encrypting an original packet in a VPN tunnel mode.

FIGS. 2A to 2C illustrate the encryption in the tunnel mode. Original packet including IP header 11 and IP datagram 12 (FIG. 2A) is to be encrypted into an ESP payload 20 with the addition of an ESP trailer (FIG. 2B). Further, the ESP payload 20 is preceded by a new IP header 31 as well as an ESP header 32 (FIG. 2C), and is added optionally with an ESP authentication 24 of 12 bytes. The new IP header 31 is added to identify the security encryption protocol, i.e., "ESP(50)". The ESP trailer is composed of three fields, a padding field 21 of variable length of 0 to 255 bytes, a padding length field 22 of one (1) byte, and a next header field 23 of one (1) byte. The padding fields 21 is provided for adjusting the ESP payload 20 to have a data length equal to a multiple of a block length, i.e., 8 or 16 bytes of the block data prescribed by the ESP encryption protocol. The padding length field 22 specifies the adjusted data length, i.e., the payload length of the ESP payload 20. The next header field 23 specifies a next protocol, i.e., the upper layer protocol such as "IP(4)" which is identified at the IP header 11 of the original packet for transmission over the internet.

Figures 3A, 3B:
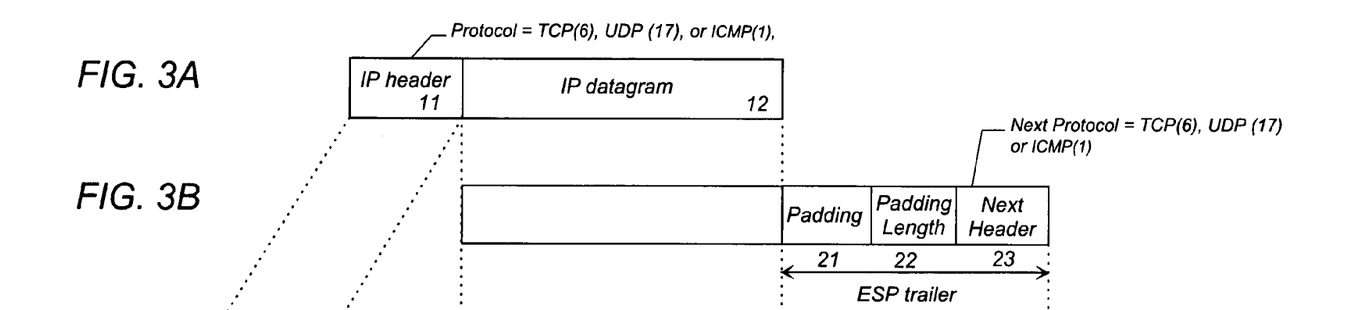
FIGS. 3A to 3C are packet structures illustrating the steps of encrypting an original packet in a VPN transport mode.
Figure 3C:
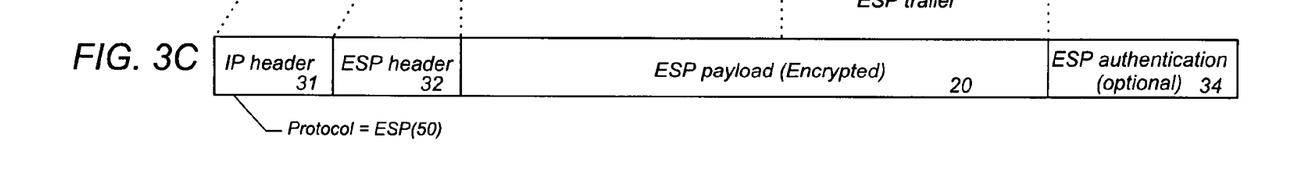

FIGS. 3A to 3C illustrate the transport mode in which the IP datagram 12 of the original packet is added with the like ESP trailer and encrypted together therewith into ESP payload 20, and unencrypted ESP header 32 is inserted between the ESP payload 20 and the IP header 31 which is modified to include the security encryption protocol, i.e., "ESP(50)". In this mode, the next header filed 23 stores the upper layer protocol, i.e., one of TCP(6), UDP(17), and ICMP(1) which is identified in the IP header 11 of the original packet.

Figure 4:
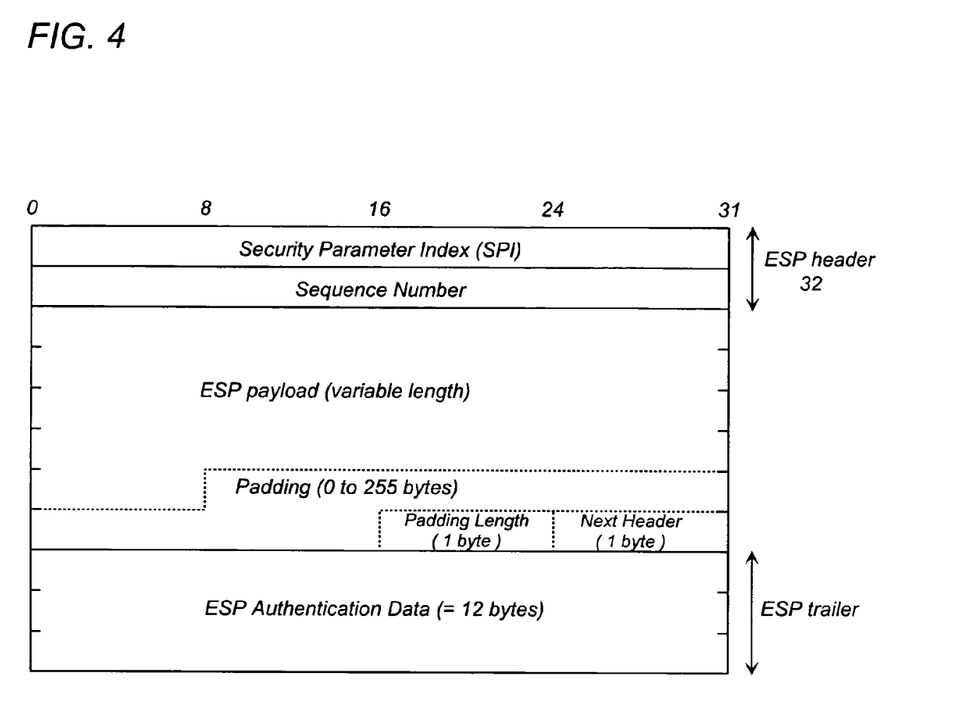
FIG. 4 illustrates a data structure of the encrypted packet.

In either mode, the ESP header 32 has a structure including a security parameter index (SPI) and a sequence number both of 4-bytes, as shown in FIG. 4. SPI identifies security parameters in combination with IP address to seek a security association when implementing the ESP protocol, while the sequence number specifies an incrementally increasing packet number transmitted over the security association.

Now referring to FIG. 5, the encryption error monitoring system is explained in connection with the encrypted packets as explained in the above. The system is composed of a detector module 60 and a manager module 80 which are realized by different computer units and are interconnected by the private network 120, although they may be realized in a single computer unit. The detector module 60 includes an internet interface 61 for data transmission with the internet 140, and a private network interface 62 for data transmission with the private network 120. In addition, the detector module 60 includes a packet filter 64 for filtering out the packets which needs the encryption error check, a filtering condition memory 65 which stores a condition for filtering packets, an encryption error judge 66 that analyzes the filtered packets to judge whether or not the packets are successfully encrypted, and an error signal generator 68 that generates an error signal when a single packet or some of the packets in a common session are judged not to be successfully encrypted. The error signal is transmitted to the manager module 80 where it is processed to output a warning notice.

The manager module 80 includes a report creator 82 which, upon receipt of the error signal, creates a report including sender's IP address, destination IP address, sender's port, destination port, protocol code, and other information identifying the error packet. The report is stored in a memory 88 to be viewed anytime through a reader 86 as the warning notice. The reader 86 is configured to output the report through the private network 120 to any computer terminal including the server 100 privileged to access the manager module 80, thereby giving the warning notice visually either on a display or a printed medium. The manager module 80 may be connected to a dedicated display or printer to output the warning notice. Also included in the manager module 80 is a filtering condition input 84 for entering parameters that identify session, i.e., packets in that session which need no encryption. The parameters, which include the sender's IP address and the destination IP address, are stored in a filtering condition table 85 and are transmitted to the filtering condition memory 65 of the detector module 60 to give the condition by which only the packets requiring the encryption are filtered out for judgment at the encryption error judge 66.

Figure 5:
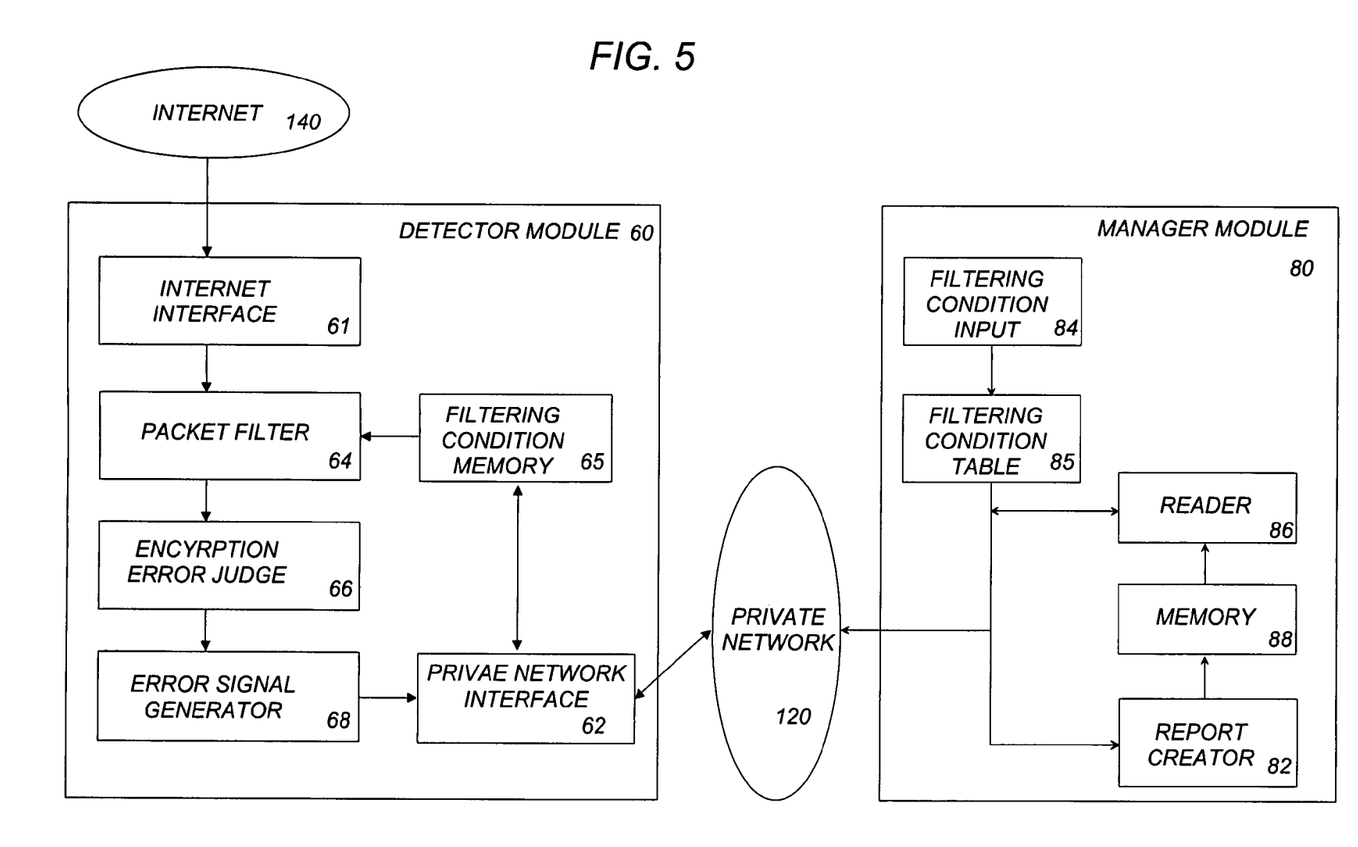
FIG. 5 is a block diagram illustrating the configuration of the encryption error monitoring system.
Figure 6:
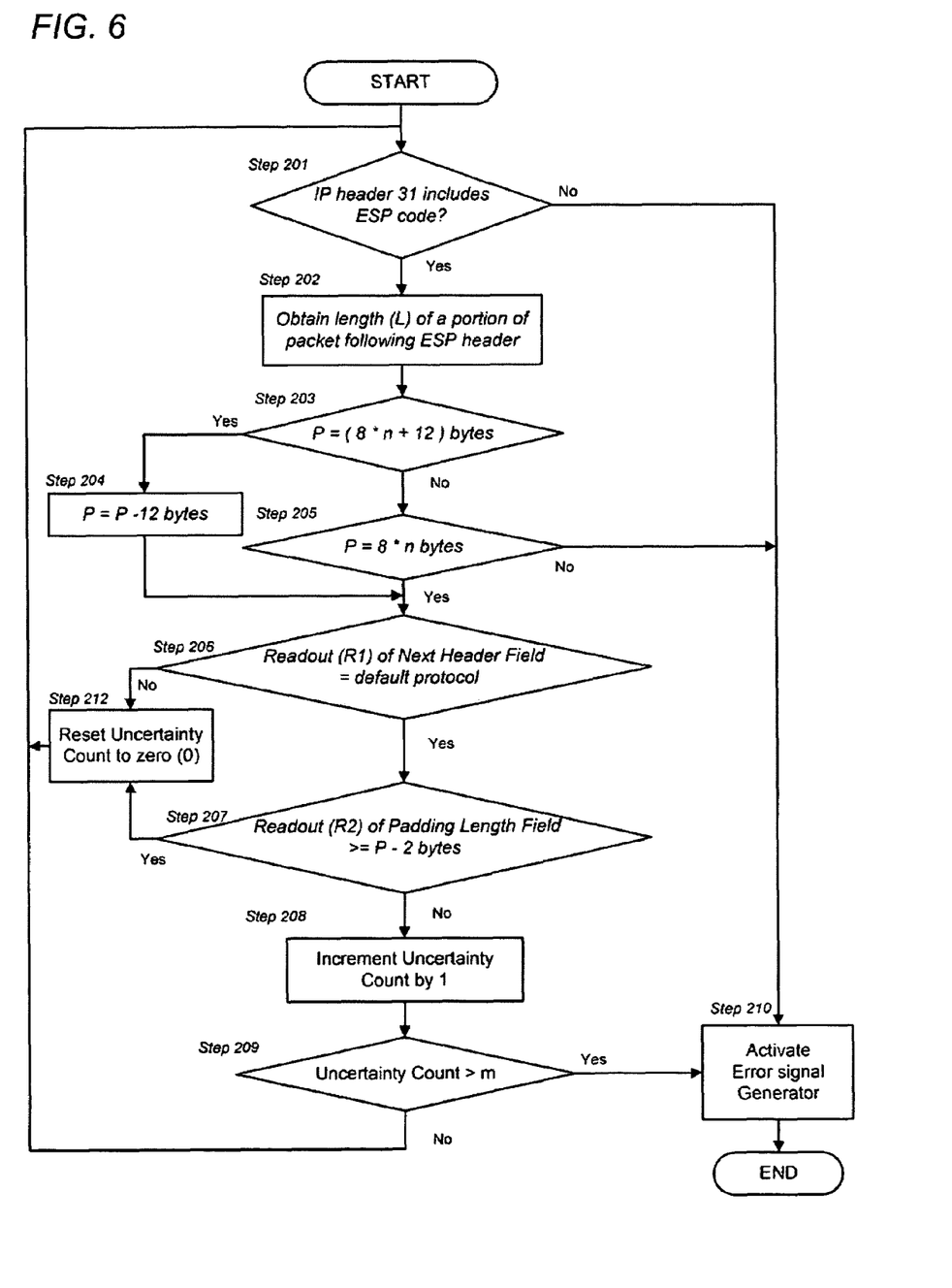
FIG. 6 is a flow chart illustrating an error detecting operation of the above system.

FIG. 5 illustrates the steps carried out at the encryption error judge 66 for determining whether or not the packets transmitted within the common session are successfully encrypted. At step 201, it is checked whether or not the packet includes ESP payload 20 by referring to the IP header 31. In this instance, the IP header 31 is rewritten to include the security code "ESP(50)" in place of the original protocol "IP(4)". Thus, when the IP header 31 is read to identify "ESP(50)", it is assumed that the encryption is successful and a judgment sequence goes to step 202 for further verification. Otherwise, it is instantly judged that the encryption is failed and the sequence goes to step 210 which activates the error signal generator 68 to issue the error signal. Step 202 is made to obtain a length (P) of ESP payload 20 plus the ESP authentication 34, i.e., the length of a portion of the packet following the ESP header 32. Step 203 is then carried out to check whether or not the length (P) satisfies an equation that P=(8*n+12) bytes, where n is an integer. When P=(8*n+12), some uncertainty remains whether the packet is truly encrypted. In this case, after the length (P) is subtracted by the length (12 bytes) of the ESP authentication 34 (P=P−12) at step 204, the packet is further analyzed through verification steps 206 to 209. When P<>(8*n+12) at step 203, step 204 follows to check whether L=8*n is satisfied. When P<>8*n, i.e., the payload length (P) is not a multiple of the block length defined by ESP, it is instantly judged that the packet is not successfully encrypted and the sequence goes to step 210 for activating the error signal generator 68. Even when P=8*n, however, there also remains some uncertainty whether the packet is truly encrypted so that verification steps 206 to 209 will follow.

At step 206, the last one byte of the packet excluding ESP authentication is referred to take an undecrypted readout (R1) of the next header field 23 which, if the encryption is successful, would be different from the real next protocol. The real next protocol, in this instance, is IP(4) which is identified in the next header field 23 as corresponding to that in the original IP header 11 and which is stored in or recognized at the encryption error judge 66 as one of default protocols. Thus, when it is found that the undecrypted readout (R1)<>IP(4), i.e., the real next protocol, it is concluded that the packet is successfully encrypted, and the sequence goes back to step 201 through reset step 212 in order to repeat the error check for the remaining packets transmitted in the common session. Reset step 212 will be discussed in later. When R1=IP(4), however, there still remains a possibility that the undecrypted readout (R1) is happen to become equal to the real next protocol through the encryption. Thus, next step 207 is relied upon to take another undecrypted readout (R2) of the penultimate one byte of the ESP payload 20, i.e., the padding length field 22, and to read the actual payload length (P) of the EPS payload 20 for comparing the undecrypted readout (R2) with the actual payload length (P) of the packet minus 2 bytes reserved for the last two fields 22 and 23. It is noted also in this connection that, since the actual payload length (P) is the sum of the real padding length and 2 bytes for the fields 22 and 23, the real padding length should be less than the actual payload length (P) minus 2 bytes and be altered during the encryption into the undecrypted readout (R2) not equal to the real padding length. Therefore, when the undecrypted readout (R2) gives an illogical value not less than the real padding length (R2≧P−2 bytes), it is concluded that the encryption is successful, and the sequence goes back to step 201 through reset step 212. If, however, when R2<P−2 bytes, there remains a less possibility that the undecrypted readout R2 be happen to satisfy the relation. In this case, the encryption error judge 66 admits uncertainty and increments an uncertainty count by 1 (one) at step 208. Then, the verification sequence goes to step 209 where the uncertainty count is checked whether it exceeds a predetermined count (m). When the uncertainty count exceeds the predetermined count (m), the judge 66 concludes the encryption error and activates the error signal generator at step 210. Otherwise, the packet is judged to be successfully encrypted so that the sequence goes back to step 201 for repeating the judgment for the remaining packets to be transmitted in the session. The encryption error judge 33 identifies a group of packets as belonging to the same session by referencing to the sender's IP address, the destination IP address, and parameters included in the security parameter index (SPI) of the ESP header 32.

Step 206 gives the result of the undecrypted readout (R1) being equal to one of the default protocols at a probability of "4/256", in which 4 is a number of the default protocols, while step 207 gives the result of R2<P−2 at a probability of "(P−2)/256" for the payload length (P) shorter than 258 bytes and at a probability of "1" for the payload length (P) greater than 258 bytes. Thus, a combination result at steps 206 and 207 would give a false judgment of concluding the encryption error for the correctly encrypted packet at a maximum provability of "1/64". The predetermined count (m) is therefore selected to reduce the provability of the false judgment to as less as $1/64^m$. In this connection, step 207 may be removed from the judgment sequence. Reset step 212 is included to reset uncertainty count to zero (0) when the single packet is judged to be successfully encrypted at either of step 206 or step 207 such that the uncertainty count will be accumulated only as a consequence of that the packets are consecutively judged to be uncertain whether or not they are successfully encrypted. In other words, step 210 is activated only when it sees consecutive events where the packets are consecutively judged over the predetermined times to be uncertain with regard to the encryption error.

Figure 7:
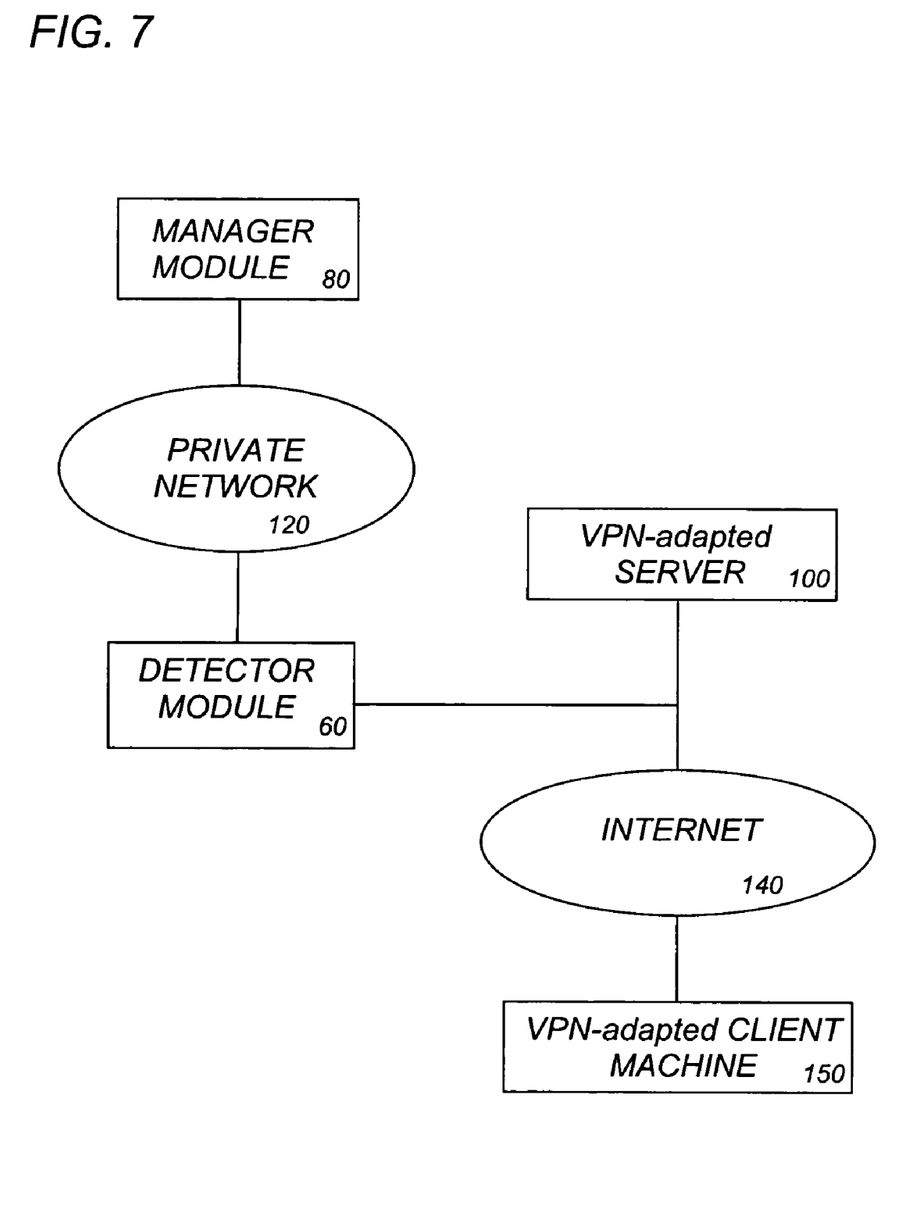
FIG. 7 is a block diagram schematically illustrating another type of the virtual private network (VPN) which may incorporate the encryption error monitoring system of the present invention.

In the above illustrated embodiment, the encryption error monitoring system of the present invention is adapted to be provided on the side of the server 100 for checking the encrypted packets being transmitted through the internet 140 between the VPN controller 130 and the client machine 150, as shown in FIG. 1. However, the system of the present invention can be equally adapted in another virtual private network (VPN) configuration, as shown in FIG. 7, where the encrypted packets are transmitted through the internet 140 only between a VPN-adapted server 100 and a VPN-adapted client machine 150 both of which are designed to include the function of encrypting and decrypting the packets transmitted through the internet 140. In this VPN configuration, the system is provided on the side of the private network 120 and is connected to the internet 140 for checking the encrypted packets between the server 100 and the client machine 150 both of which are designated at the manager module 80 to be supervised. The transport mode is utilized for encrypting the packets in the VPN configuration of FIG. 7.

In either of the VPN configurations shown in FIGS. 1 and 7, the encryption error monitoring system can accomplish the error checking only with the security protocol in addition to open information included in the original packet, but without relying upon any other parameters utilized for decrypting the packets. Thus, the system can be provided independently of the VPN controller 130 or the VPN-adapted server 100, and is therefore designed into a rather simple configuration.

The invention claimed is:

1. An encryption error monitoring system for checking packets transmitted between a private network and an external network, said system comprising:
   a detector module configured to be connected to receive said packet for determining whether or not said packet is successfully encrypted in accordance with a specific security protocol, said detector module being configured to read from said packet a sender's address and a destination address, and to provide an error signal when said packet is judged not to be successfully encrypted,
   a manager module which is configured to be connected to said detector module within said private network, and to create, upon receipt of said error signal, a report including said sender's address and said destination address with regard to the packet determined not to be successfully encrypted,
   said detector module including a judge means configured to read a header included in said packet and checks whether or not said header includes a protocol code that matches with a particular code identifying said specific security protocol, said judge means providing said error signal when said header does not include the protocol code that matches with said particular code,
   wherein
   said manager module is configured to set a condition for determining whether or not the packet is to be encrypted, and transmits said condition to said detector module;
   said detector module including a packet filter configured to filter out the packet designated to be encrypted in accordance with said condition, such that said judge means processes said packet designated to be encrypted.

2. An encryption error monitoring system for checking packets transmitted between a private network and an external network, said system comprising:
   a detector module configured to be connected to receive said packet for determining whether or not said packet is successfully encrypted in accordance with a specific security protocol, said detector module being configured to read from said packet a sender's address and a destination address, and to provide an error signal when said packet is judged not to be successfully encrypted,
   a manager module which is configured to be connected to said detector module within said private network, and to create, upon receipt of said error signal, a report including said sender's address and said destination address with regard to the packet determined not to be successfully encrypted,
   said detector module including a judge means configured to read a header included in said packet and checks whether or not said header includes a protocol code that matches with a particular code identifying said specific security protocol, said judge means providing said error signal when said header does not include the protocol code that matches with said particular code,
   wherein
   said judge means is configured to refer to a security payload (20) which is included in said packet to succeed said header (31) for giving an encrypted data, and to read a payload length of said security payload, said judge means providing said error signal when said payload length (P) is not a multiple of a block length which is prescribed by said specific security protocol to define said payload.

3. An encryption error monitoring system for checking packets transmitted between a private network and an external network, said system comprising:
   a detector module configured to be connected to receive said packet for determining whether or not said packet is successfully encrypted in accordance with a specific security protocol, said detector module being configured to read from said packet a sender's address and a destination address, and to provide an error signal when said packet is judged not to be successfully encrypted,
   a manager module which is configured to be connected to said detector module within said private network, and to create, upon receipt of said error signal, a report including said sender's address and said destination address with regard to the packet determined not to be successfully encrypted,
   said detector module including a judge means configured to read a header included in said packet and checks whether or not said header includes a protocol code that matches with a particular code identifying said specific security protocol, said judge means providing said error signal when said header does not include the protocol code that matches with said particular code,
   wherein
   said judge means is configured to refer to a security payload (20) which is included in said packet to succeed said header (31) for giving an encrypted data,
   said security payload including an encrypted trailer having a next header field (23) which specifies an upper layer protocol designated by said specific security protocol to identify the nature of said security payload,
   said judge means reading a portion of said security payload corresponding to said next header field to take an undecrypted readout (R1) for comparison with one of default protocols already known to said judge means as identifying said upper layer protocol,
   said judge means incrementing an uncertainty count when the following conditions are met for each of the packets transmitted within a common session:
   a) said header (31) includes the protocol code that matches with said particular code,
   b) said undecrypted readout (R1) is in match with one of said default protocols, said judge means providing said error signal when said uncertainty count exceeds a predetermined count (m).

4. An encryption error monitoring system for checking packets transmitted between a private network and an external network, said system comprising:
- a detector module configured to be connected to receive said packet for determining whether or not said packet is successfully encrypted in accordance with a specific security protocol, said detector module being configured to read from said packet a sender's address and a destination address, and to provide an error signal when said packet is judged not to be successfully encrypted,
- a manager module which is configured to be connected to said detector module within said private network, and to create, upon receipt of said error signal, a report including said sender's address and said destination address with regard to the packet determined not to be successfully encrypted,
- said detector module including a judge means configured to read a header included in said packet and checks whether or not said header includes a protocol code that matches with a particular code identifying said specific security protocol, said judge means providing said error signal when said header does not include the protocol code that matches with said particular code, wherein
said judge means is configured to refer to a security payload (20) which is included in said packet to succeed said header (31) for giving an encrypted data,
said security payload including an encrypted trailer composed of
- a padding field (21) which adjusts a payload length of said security payload for encryption;
- a padding length field (22) which identifies said payload length adjusted by said padding field,
- a next header field (23) which stores an upper layer protocol designated by said specific security protocol to identify the nature of said security payload, said judge means reading
i) the payload length (P),
ii) a portion of said security payload corresponding to said next header field to take a first undecrypted readout (R1) for comparison with one or more of default protocols already known to said judge means as identifying said upper layer protocol,
iii) another portion of said security payload corresponding to said padding length field to take a second undecrypted readout (R2) for comparison with a payload length of said security payload, said judge means incrementing an uncertainty count (m) when all of the following conditions are met for each of the packets transmitted within a common session:
a) said header (31) includes the protocol code that matches with said particular code,
b) said first undecrypted readout (R1) is in match with one of said default protocols,
c) said second undecrypted readout (R2) represents a numerical value which shorter than the payload length minus the length of said encrypted trailer except said padding field, said judge means providing said error signal when said uncertainty count exceeds a predetermined count (m).

5. An encryption error monitoring system for checking packets transmitted between a private network and an external network, said system comprising:
- a detector module configured to be connected to receive said packet for determining whether or not said packet is successfully encrypted in accordance with a specific security protocol, said detector module being configured to read from said packet a sender's address and a destination address, and to provide an error signal when said packet is judged not to be successfully encrypted,
- a manager module which is configured to be connected to said detector module within said private network, and to create, upon receipt of said error signal, a report including said sender's address and said destination address with regard to the packet determined not to be successfully encrypted,
- said detector module including a judge means configured to read a header included in said packet and checks whether or not said header includes a protocol code that matches with a particular code identifying said specific security protocol, said judge means providing said error signal when said header does not include the protocol code that matches with said particular code, wherein
said judge means is configured to refer to a security payload (20) which is included in said packet to succeed said header (31) for giving an encrypted data,
said security payload including an encrypted trailer composed of
- a padding field (21) which adjusts a payload length (P) of said security payload for encryption;
- a padding length field (22) which identifies said payload length adjusted by said padding field,
- a next header field (23) which stores an upper layer protocol designated by said specific security protocol to identify the nature of said security payload, said judge means reading
i) the payload length (P),
ii) a portion of said security payload corresponding to said next header field to take a first undecrypted readout (R1) for comparison with one or more of default protocols already known to said judge means as identifying said upper layer protocol,
iii) another portion of said security payload corresponding to said padding length field to take a second undecrypted readout (R2) for comparison with the payload length, said judge means incrementing an uncertainty count when all of the following conditions are met for each of the packets transmitted within a common session:
a) said header includes the code that matches with said particular code,
b) said payload length (P) is a multiple of a block length which is prescribed by said specific security protocol to define said payload,
c) said first undecrypted readout (R1) is in match with one of said default protocols,
d) said second undecrypted readout (R2) represents a numerical value which shorter than the payload length minus the length of said encrypted trailer except said padding field, said judge means providing said error signal when said uncertainty count exceeds a predetermined count (m).

6. An encryption error monitoring method for checking encrypted packets transmitted between a private network and an external network, said method comprising the steps of:
- acquiring a security protocol code which identifies a specific security protocol relied upon for encrypting an original packet into said encrypted packet, said security protocol code being different from an original protocol code included in said original packet,
- reading an unencrypted header (31) of said encrypted packet to take therefrom a protocol code in addition to a sender's address and a destination address;

comparing said protocol code with said security protocol code to determine an encryption error when both codes are found identical to each other;

creating a report listing said sender's address and said destination address in response to said encryption error, wherein said method further includes the steps of:

referring to a security payload (20) which is included in said encrypted packet and succeeding said header (31) to give an encrypted datagram;

reading a payload length (P) of the security payload, determining said encryption error when said payload length is not a multiple of a block length which is prescribed by said specific security protocol to define said payload.

7. An encryption error monitoring method for checking encrypted packets transmitted between a private network and an external network, said method comprising the steps of:

acquiring a security protocol code which identifies a specific security protocol relied upon for encrypting an original packet into said encrypted packet, said security protocol code being different from an original protocol code included in said original packet, reading an unencrypted header (31) of said encrypted packet to take therefrom a protocol code in addition to a sender's address and a destination address;

comparing said protocol code with said security protocol code to determine an encryption error when both codes are found identical to each other;

creating a report listing said sender's address and said destination address in response to said encryption error, wherein said method further includes the steps of:

referring to a security payload (20) which is included in said encrypted packet and succeeding said header (31) to give an encrypted datagram, said security payload including an encrypted trailer having a next header field (23) which specifies an upper layer protocol designated by said specific security protocol to identify the nature of said security payload, reading a portion of said security payload corresponding to said next header field to take an undecrypted readout (R1) for comparison with one of default protocols predetermined as identifying said upper layer protocol, incrementing an uncertainty count when all of the following conditions are met for each of the encrypted packet transmitted within a common session,
 a) said header includes the protocol code that matches with said particular code,
 b) said undecrypted readout (R1) is in match with one of said default protocols, determining the encryption error when said uncertainty count exceeds a predetermined count (m).

8. An encryption error monitoring method for checking encrypted packets transmitted between a private network and an external network, said method comprising the steps of:

acquiring a security protocol code which identifies a specific security protocol relied upon for encrypting an original packet into said encrypted packet, said security protocol code being different from an original protocol code included in said original packet, reading an unencrypted header (31) of said encrypted packet to take therefrom a protocol code in addition to a sender's address and a destination address;

comparing said protocol code with said security protocol code to determine an encryption error when both codes are found identical to each other;

creating a report listing said sender's address and said destination address in response to said encryption error, wherein said method further includes the steps of:

referring to a security payload (20) which is included in said encrypted packet and succeeding said header (31) to give an encrypted datagram, said security payload including an encrypted trailer composed of
 a padding field (21) which adjusts a payload length of said security payload for encryption;
 a padding length field (22) which identifies a length to which said security payload is adjusted by said padding field,
 a next header field (23) which stores an upper layer protocol designated by said
 specific security protocol to identify the nature of said security payload, reading a portion of said security payload corresponding to said next header field to take a first undecrypted readout (R1) for comparison with one or more of default protocols predetermined as identifying said upper layer protocol, reading another portion of said security payload corresponding to said padding length field to take a second undecrypted readout (R2) for comparison with a payload length of said security payload, incrementing an uncertainty count when all of the following conditions are met for each of the packets transmitted within a common session:
 a) said header includes the protocol code in match with said particular code,
 b) said first undecrypted readout (R1) is in match with one of said default protocols,
 c) said second undecrypted readout (R2) represents a numerical value which shorter than the payload length minus the length of said encryption trailer except said padding field, determining the encryption error when said uncertainty count exceeds a predetermined count (m).

9. An encryption error monitoring method for checking encrypted packets transmitted between a private network and an external network, said method comprising the steps of:

acquiring a security protocol code which identifies a specific security protocol relied upon for encrypting an original packet into said encrypted packet, said security protocol code being different from an original protocol code included in said original packet, reading an unencrypted header (31) of said encrypted packet to take therefrom a protocol code in addition to a sender's address and a destination address;

comparing said protocol code with said security protocol code to determine an encryption error when both codes are found identical to each other;

creating a report listing said sender's address and said destination address in response to said encryption error, wherein said method further includes the steps of:

referring to a security payload which is included in said encrypted packet and succeeding said header to give an encrypted datagram, said security payload including an encrypted trailer composed of
 a padding field (21) which adjusts a payload length of said security payload for encryption;
 a padding length field (22) which identifies a length to which said security payload is adjusted by said padding field,
 a next header field (23) which stores an upper layer protocol designated by said specific security protocol to identify the nature of said security payload, reading a portion of said security payload corresponding to said next header field to take a first undecrypted readout (R1) for comparison with one or more of default protocols predetermined as identifying said upper layer protocol, reading another portion of said security payload corresponding to said padding length field to take a second undecrypted readout (R2) for comparison with a payload length of said security payload, incrementing an uncertainty count when all of the following conditions are met for each of the packets transmitted within a common session:

a) said header include the protocol code in match with said particular code, b) said payload length (P) is a multiple of a block length which is prescribed by said specific security protocol to define said payload, c) said first undecrypted readout (R1) is in match with one of said default protocols, d) said second undecrypted readout (R2) represents a numerical value which shorter than the payload length (P) minus the length of said encryption trailer except said padding field, determining the encryption error when said uncertainty count exceeds a predetermined count (m).

* * * * *